United States Patent
Draper et al.

[11] Patent Number: 5,989,702
[45] Date of Patent: Nov. 23, 1999

[54] SANDWICH INSULATION FOR INCREASED CORONA RESISTANCE

[75] Inventors: Robert Edward Draper; G. Paul Jones; Robert H. Rehder; Michael Stutt, all of Peterborough, Canada

[73] Assignee: General Electric Canada Inc., Mississauga, Canada

[21] Appl. No.: 08/692,961

[22] Filed: Aug. 7, 1996

Related U.S. Application Data

[63] Continuation of application No. 08/379,766, Jan. 27, 1995, abandoned.

[30] Foreign Application Priority Data

Aug. 15, 1994 [CA] Canada ................................. 2130161

[51] Int. Cl.⁶ ........................ B32B 19/04; B32B 27/04; B32B 27/06; B32B 27/20
[52] U.S. Cl. ........................ 428/328; 428/323; 428/324; 428/329; 428/330; 428/331; 428/412; 428/413; 428/423.1; 428/423.7; 428/425.5; 428/447; 428/454; 428/473.5; 428/475.2; 428/480; 174/120 SR; 174/120 R; 174/121 R; 174/121 SR; 174/120 C; 174/124 R; 174/124 GC; 174/110 SR; 174/110 S; 174/110 E; 174/122 R; 174/122 C; 174/127
[58] Field of Search ..................... 428/324, 328, 428/329, 331, 473.5, 454, 289, 480, 283, 288, 281, 292, 294, 323, 330, 412, 413, 447, 423.1, 423.7, 425.5, 475.5; 524/430, 437, 428, 404, 413; 174/120 R, 120 C, 110 SR, 110 E, 110 S, 122 G, 122 C, 122 R, 124 R, 124 GC, 127, 121 SR, 120 SR, 128.1, 128.2

[56] References Cited

U.S. PATENT DOCUMENTS

| | | |
|---|---|---|
| 4,033,805 | 7/1977 | Mitsui et al. ........................ 156/185 |
| 4,259,398 | 3/1981 | Seino et al. ........................ 428/283 |
| 4,273,825 | 6/1981 | Nishiyama et al. ................ 428/223 |
| 4,286,010 | 8/1981 | Staley et al. ........................ 428/215 |
| 4,332,836 | 6/1982 | Urban ..................................... 427/44 |
| 4,399,190 | 8/1983 | Iwabuchi et al. ................... 428/336 |
| 4,399,191 | 8/1983 | Iwabuchi et al. ................... 428/336 |
| 4,536,041 | 8/1985 | Keane et al. ....................... 428/372 |
| 4,748,048 | 5/1988 | Anton et al. ....................... 427/116 |
| 4,760,296 | 7/1988 | Johnston et al. ..................... 310/45 |
| 4,769,276 | 9/1988 | Gruss et al. ........................ 428/251 |
| 4,935,302 | 6/1990 | Hjortsberg et al. ................ 428/383 |
| 5,061,554 | 10/1991 | Hjortsberg et al. ................ 428/220 |

FOREIGN PATENT DOCUMENTS

| | | |
|---|---|---|
| 1168857 | 6/1984 | Canada . |
| 1208325 | 7/1986 | Canada . |
| 1289610 | 9/1991 | Canada . |
| 2130161 | 8/1994 | Canada . |
| 54-157203 | 12/1979 | Japan . |
| 5553802 | 4/1980 | Japan . |
| 56-100402 | 8/1981 | Japan . |
| 56-158409 | 12/1981 | Japan . |
| 2-240901 | 9/1990 | Japan . |
| 4-067511 | 3/1992 | Japan . |
| 4-207940 | 7/1992 | Japan . |
| 939747 | 10/1963 | United Kingdom . |

*Primary Examiner*—Vivian Chen
*Attorney, Agent, or Firm*—Edward H. Oldham

[57] ABSTRACT

A sandwich type insulation for electrical machinery comprising a laminate of a polymeric material such as polyimide which contains particles of an inorganic corona resistant material, said polymeric material being bonded to mica paper consisting of mica, wherein said mica paper may be impregnated with polymeric resin containing particles of inorganic corona resistant material. The resultant insulation may be used as a tape or wrapper.

12 Claims, 2 Drawing Sheets

SANDWICH INSULATION FOR INCREASED CORONA RESISTANCE

This application is a continuation of application Ser. No. 08/379,766, filed Jan. 27, 1995, now abandoned.

This invention relates to an insulating material which comprises layers of insulating material in a sandwich type of construction. The layers of insulation are preferably a film of a polymeric material, which preferably contains a corona resistant material such as submicron sized alumina particles present in sufficient quantity to enhance the corona resistance of the polymeric material and a mica layer. The polymeric film (preferably a polyimide) is bonded to the mica paper layer by a suitable resin which will preferably be a polymeric material which itself may or may not contain a corona resistant material. The polymeric resin material is of such nature as to at least partially impregnate the mica paper film and to provide the necessary adhesive qualities to bond the mica paper and the polymeric film into a unitary laminated sheet or tape.

Insulating electrical conductors in electrical apparatus has undergone significant improvement since the development of the early machines of the nineteenth century. As demands were made to supply larger and more efficient machines for industrial and commercial application, the insulation systems employed by designers has evolved to provide more withstand strength and yet occupy less space in the machine. It is to be remembered that most electrical machines are made of an electrically conductive material, a magnetic material and an insulation system. Basically, the magnetic material and the electrical conducting material are the two active materials that determine the machine performance and output capability and the insulation is only present to assure that the electricity flows only in predetermined paths. Thus, the required insulation should occupy a minimum of space and yet provide the necessary insulation between adjacent electrical conductors, and between conductors and any adjacent materials which are at ground potential.

As the voltage ratings have been pushed to higher and higher levels, designers have had to look for ways to increase the gradients for electrical potentials in order that the insulation does not occupy an inordinate amount of space. Generally the resistance to heat flow through an insulating material varies linearly as the length of the path, thus, there are two significant reasons for keeping the thickness of insulation to a minimum. Thus the decrease in the resulting insulation thickness allows for improved thermal performance of the insulation.

In the past, electrical machines have traditionally used varnish, enamel compounds or glass wrap to coat individual conductors to supply the required primary strand or "turn to turn" insulation for individual conductors. In rotating machines especially, the above conductors are wound into coils, and each coil is provided with a second insulating medium, and this insulation takes the form of an insulating tape or wrapper wrapped around the group of individual conductors which have been formed into a predetermined shape to form a coil. The varnishes that functioned satisfactorily in the earlier lower voltage machines gradually were surpassed by enamels, and more recently by polymeric materials such as polyesters, polyesteramides, polyesteramideimides and polyimides to mention only a few commercially available conductor coatings.

Coil insulation has evolved from cotton tape wrapped in layers in a lapped fashion to provide the necessary insulation to an asphaltic insulation which comprised lapping coils with a tape coated with a petroleum based compound which subsequently was coated with a layer of mica flakes. The mica flakes provided an insulation resistance to a phenomena generally known as "corona" which tends to be more problematic as operating voltage levels of the rotating machines were increased.

For the individual conductors forming the coils, it is also advantageous to provide protection against corona deterioration of the insulation of individual conductors and thus, a corona resistant material is now routinely added to the polymeric conductor insulation. Canadian Patents 1,168,857 and 1,208,325 provide examples of the addition of various compounds such as submicron sized particles of alumina or silica to polymeric compositions used to coat individual conductors which may be advantageously used to enhance corona resistance of the conductor insulative coating. The addition of the particles of alumina or silica may also improve the heat transfer characteristics of the conductor insulation as well.

The taped insulation applied to the coils has undergone evolutionary changes as well. Gradually, glass fiber tapes came to be used as a carrier for mica flakes and a host of polymeric materials were used to provide the adhesive forces necessary to keep the flakes of mica in place on the tape. The coil was wound by conventional lap winding techniques and subsequently placed in a coil forming device and a vacuum-pressure-impregnating (VPI) process was employed to impregnate the taped coil with a suitable insulation material such as an uncured polymeric material to fill all the voids and interstices in the lapped insulation, and the coil was heated to cure the composite coil and insulation by a polymerization process.

An alternative process for insulating coils of electric machines is to wind the coil or strands with a layered tape which has been liberally covered with a "B" stage polymeric resin in a standard lapping fashion, until the desired number of laps have been applied to the coil or strand and then apply heat and pressure to the coil or strand to drive the polymeric material to gelation.

It will be found that during the heating and pressing operation, that the viscosity of the "B" stage polymeric material will initially drop and any excess resin will be squeezed from the coil by the press employed to give the coil its final shape.

The resin rich tape described above will no doubt have as one of its constituents in one form or another flakes of mica to give the required insulative capability.

It as the function of the flakes of mica to improve the corona resistance of the secondary insulation as well as maintain a good heat transfer characteristic of the secondary insulation.

As time went by, combinations of glass fiber, polymeric films, mica flakes or mica paper (a film composed of flakes of mica made in a process similar to the manufacture of paper) found their way into insulating tapes, and the taped coil was subsequently subjected to a VPI process or press curing process and cured to form a coil.

Problems arose in the use of certain tapes, because the polymeric films tend to prevent complete impregnation of the layers of insulating tape during the VPI process. This results in voids in the layers of insulation, and when subjected to a voltage stress, each void serves as a primary site for the initiation of corona.

Because of its nature, the sandwich type of insulation tape has proved to be an insulating material which is particularly adaptable to and susceptible to change. Mica in one form or another generally is found as one of the components of the sandwich.

Amongst the heat conducting, insulating materials available, aluminum oxide is well known for its superior insulating qualities and its excellent heat conducting qualities. Depending on the size of particles of aluminum oxide, its presence in the tape will enhance both the tape's heat conductivity and its corona resistance but the degree of enhancement is largely dependent on the particular size of the particles of alumina chosen. For purposes of this application, the primary interest is to improve the corona resistance of the insulating tape and thus the size of almina particle preferred is in the order of 0.5 micron or less.

Thus the sandwich type of insulation tapes has proved effective in providing superior insulation properties as applied to rotating electrical machinery. The voltage stress applied to a per unit thickness has undergone significant increase in the past and this means that the voltage rating of a particular machine may be increased for the same thickness of insulation. Use of heat conducting materials such as finely divided alumina, silica, beryllia, etc. have increased the thermal conductivity of the insulation, so that heat is able to flow more easily to the cooler parts of the machine so that current ratings of the coils may be subsequently increased.

Accompanying the improvement in voltage withstand stress has been a gradual improvement in resistance to corona breakdown of the insulation. This has enabled designers to reduce the thickness of the insulating layers over the years to the thicknesses present today.

Because of the stability of the polymeric materials in higher temperature environments, the thermal breakdown temperature of the insulating tapes has been constantly increased allowing machine performance and capability to be improved.

Lastly, it is important to examine the physical characteristics of an insulating tape that would adapt it for use in electric machines.

Since most coils are insulated by wrapping the coil with rolls of insulating tape, it becomes obvious that the tape must have tensile and wrapping strengths to permit it to be wrapped around the coil conductors without breaking under normal tension conditions. The tape must lie flat without bulges, etc. in the resultant layer of insulation.

The rolls of insulation should be amenable to a predetermined storage time, and at no time may any de-layering or delamination of any layers of the insulating tape be tolerated. Thus, it is imperative that the insulating tape possess the property to allow it to be easily unrolled without any damage to the tape as it is being unrolled, even after periods of storage. It is absolutely essential that the coil, after curing, be completely free of voids.

SUMMARY OF THE INVENTION

It is with the above objectives in mind that this invention has been made. Basically, this invention comprises a filled film material such as a polymeric material preferably materials such as polyester, polyesteramide, polyesteramideimide, polyamide, polyimide, polyamideimide, polycarbonate, polysulfone, or polyether will be found to be useful. These polymeric materials are preferably, filled with a finely divided material have corona resistant properties such as:

boron nitride
aluminum nitride
silicon nitride
aluminum oxide
magnesium oxide
beryllium oxide
silicon oxide
zirconium oxide
titanium oxide to improve the life of the film in a voltage stressed environment. Throughout the balance of this description, these compounds will be understood to be the preferred corona resistant materials. Laminated to the polymeric is a mica paper of the type commercially available and previously described.

The mica paper is effectively laminated to the polymeric film by means of a polymeric resin which itself may be loaded with a corona resistant material. The resultant tape is amenable to unrolling from its rolled state, may be stored conveniently for reasonable periods of time without using difficult storage conditions. The voltage withstand strength and lifetime operability is considerably better than previous tapes of the glass fiber cloth tape—mica paper—polymeric film laminate employed previously.

DESCRIPTION OF THE PREFERRED EMBODIMENT

Figure 1:
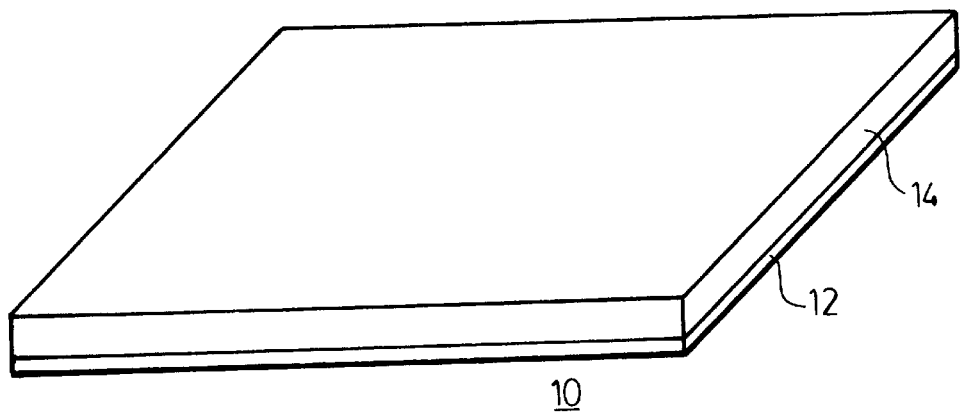
FIG. 1 is a drawing showing the tape laminate of this invention.

FIG. 1 is a perspective view showing the laminated tape of this invention.

Figure 2:
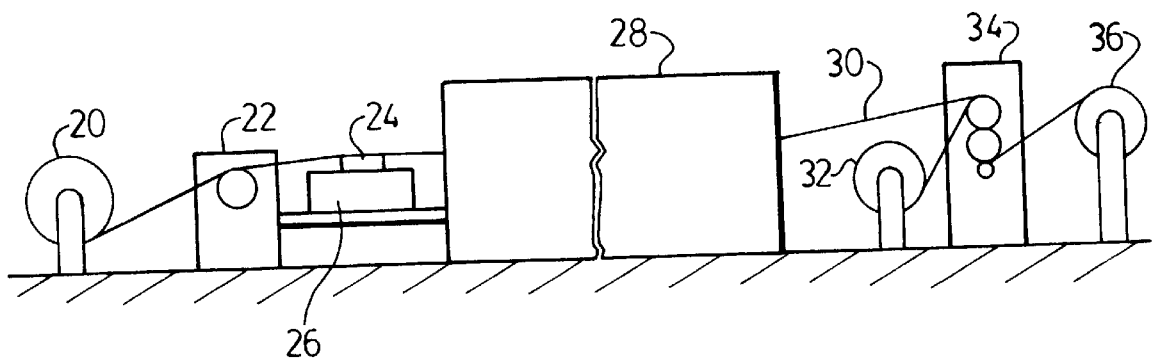
FIG. 2 shows the basic apparatus for accomplishing the invention.

FIG. 2 is a simplified version of the apparatus used to accomplish this invention.

Referring now to the drawings, a tape 10 of this invention (much magnified) is shown. The tape is composed of a film of a polymeric material 12 in this instance CR®KAPTON (a polyimide of DuPont where the letters CR are generally taken to mean "corona resistant") to which is bonded a film of mica paper 14. The two films are bonded together with a polymer resin suitable for this purpose.

The film 12 of a polymeric material which maybe anyone of a selected group listed in the summary of the invention, but for the purpose of this description, the film preferred is CR KAPTON® because of its physical and electrical insulating properties. The heat conductivity and the corona resistance properties of any of the polymeric films may be enhanced by the addition of finely divided particles of alumina to the film such that particles smaller than 0.5 micron will significantly improve the corona resistance and particles of greater size that 0.5 micron to 15 microns improve the thermal conductivity of the polymeric film. Typically, it would be preferred to have fumed alumina, silica, beryllia, etc. in a concentration of between 10–40% by weight of the polymeric film.

The mica paper is commercially available in a variety of thicknesses and as is well known in the art, is manufactured by a process which is very similar to the process employed fro the manufacture of paper. It will be found that the physical properties of the mica paper are such that another material such as a glass fibre tape, or dacron or some other material having the desirable tensile strength and electrical voltage withstand capability has traditionally been bonded to the mica paper film. This invention preferably bonds the mica film to the polymeric film by means of an epoxy resin to provide the required bonding. Preferably, the polymeric resin may be any one of a selected group comprising epoxies, polyesters, silicone, bismaleide, or cyanate ester but for the purposes of this invention, applicants prefer to use epoxy. No matter which polymeric resin is chosen, its corona resistance may be enhanced by the addition of one of the compounds selected from, alumina, silica, beryllia, etc. in a very small particle size. The corona resistance will be improved by the addition of 10 to 40% of fumed alumina of a particle size less than 0.5 microns (for instance see Canadian Patents 1,168,857 and 1,208,325). If it is desired to improve the heat transfer capabilities of the resin larger particles of the corona resistant materials above may be employed (See Canadian Patent #1,289,610).

The product of FIG. 1 may be manufactured in a number of ways but the apparatus of FIG. 2 may be used to produce the laminated tape.

A roll of mica paper 20 of a predetermined width and thickness is provided for the beginning of the process. A layer of the mica paper is fed into guide rolls 22 and then over a coating device 24 where the underside of the layer is "kiss" coated with a solvent resin solution 26. The coated mica paper is then passed through an oven 28 where the solvent is driven off and the resin is impregnated into the mica paper.

The mica paper 30 now impregnated with the resin is mated with a film of CR®KAPTON which is fed from roll 32 to pressing device 34. The CR®KAPTON and the impregnated mica paper are bonded in device 34 to form a unitary laminated sandwich, which is subsequently rolled onto roll 36. The result is a spirally formed roll of a laminated sandwich type of insulation.

The strength of the resulting laminated tape is excellent, and if filled polyamide (KAPTON®) is selected as the polymeric film 32, the electrical characteristics are superior. Because the laminated film is at least partially cured. the laminated tape roll may be conveniently stored in a cool dry environment and yet be capable of unrolling at a later date without experiencing damage due to layer to layer adhesion, or delamination.

The resulting laminate has excellent electrical and physical properties. Because the mica paper has been at least partially impregnated with corona resistant materials during the manufacturing process, any resultant coil manufactured using the laminated tape will already have corona resistant material incorporated into the layers of insulated tape and problems arising from voids in the VPI process are not as critical.

Figure 3:
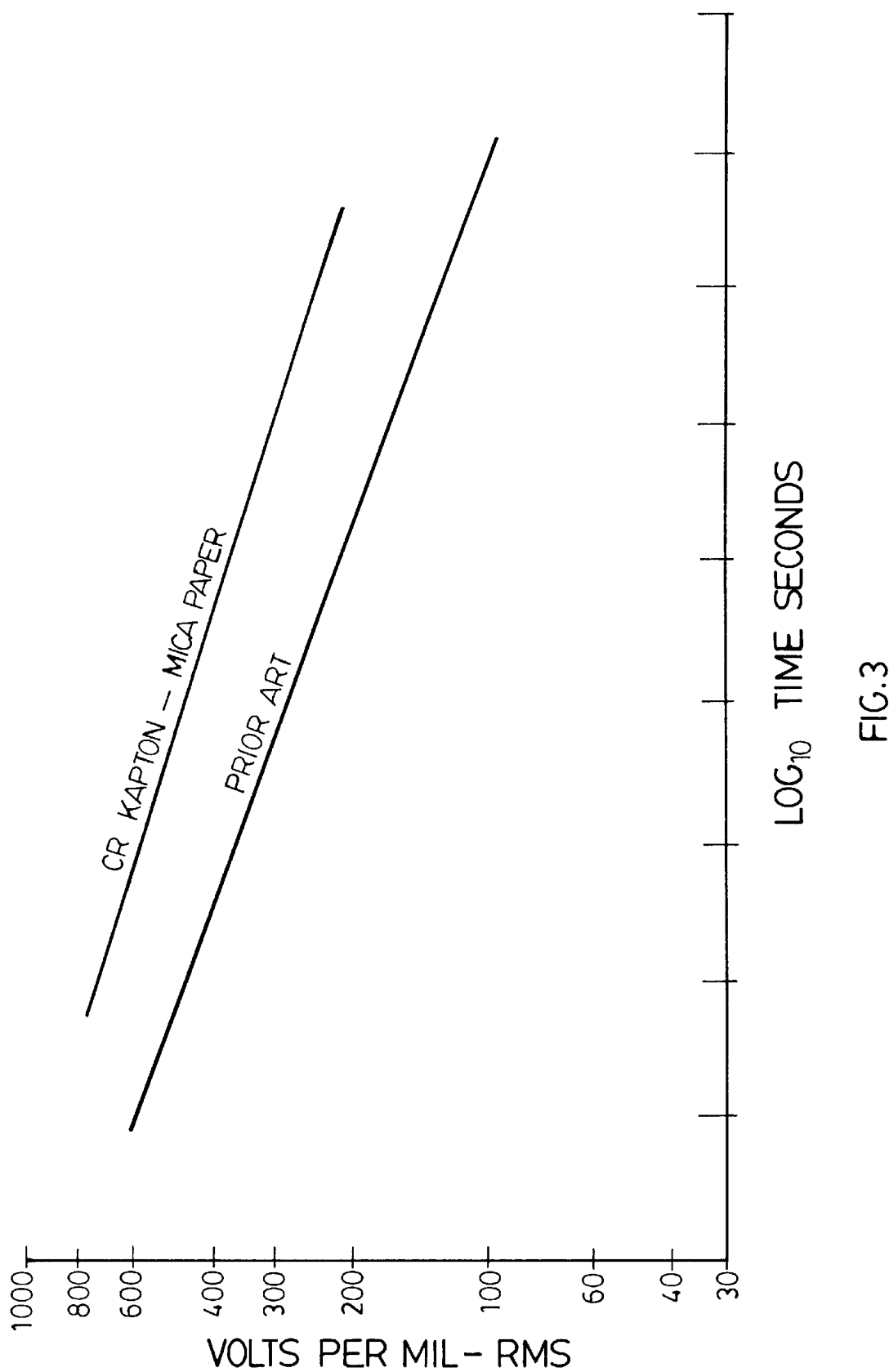
FIG. 3 is a graph showing the improvement in performance of the insulation of this invention over the prior art insulation.

The results of laboratory tests for a laminated tape composed of CR®KAPTON and mica paper produced in accordance with the process previously described above is shown in FIG. 3. It will be seen that the "withstand period" has been increased significantly for the CR®KAPTON—MICA PAPER laminate insulation.

It is, therefore, believed that the resultant physical and electrical qualities of the resultant tape make possible a more efficient electrical machine, because of the laminates superior characteristics. This gives the electrical designer more latitude in upgrading the ratings of existing machines undergoing remanufacture, and allows the production of a smaller machine to achieve the ratings of machines which of necessity with previous insulating systems were larger.

Because of the superior corona resistance of the laminated tape, the life of the machine, the coils of which are manufactured using the lapped tape of this invention will have an improved working life.

The embodiments of the invention in which an exclusive property or privilege is claimed are defined as follows:

1. An insulating material comprising a polymeric film having particles of inorganic corona resistant material incorporated therein, said film having a layer of mica paper consisting of mica laminated thereto to form a composite layered insulating medium.

2. The insulating material as claimed in claim 1 wherein the polymeric film is selected from the group consisting of:
   a polyester,
   a polyesteramide,
   a polyesteramideimide,
   a polyimide,
   a polyamide,
   a polyamideimide,
   a polyetherimide,
   a polycarbonate,
   a polysulfone, and
   a polyether.

3. The insulating material of claims 1 or 2 in which the polymeric film is filled with said particles of inorilc corona resistant material to a predetermined level and wherein said inorganic corona resistaint material comprises at least one compound selected from the group consisting of:
   boron nitride,
   aluminum nitride,
   silicon nitride,
   aluminum oxide,
   magnesium oxide,
   beryllium oxide,
   silicon oxide,
   zirconium oxide, and
   titanium oxide,
and wherein the compound has a particle size of less than 0.1 micron.

4. A sandwich type insulating material comprising a layer of a preselected corona resistant polymeric material, to which paticles of inorganic corona resistant compound has been added, and, to which is laminated a layer of nica paper consisting of mica, the mica paper being at least partially impregnated with a preselected polymeric resin.

5. A sandwich type insulating material as claimed in claim 4 in which the preselected corona resistant polymeric material is selected from the group consisting of:
   a polyester,
   a polyesteramide,
   a polyesteramideimide,
   a polyimide,
   a polyamide,
   a polyamideimide,
   a polyetherimide,
   a polycarbonate,
   a polysulfone, and
   a polyether,
and the preselected polymeric resin comprises at least one of the resins selected from the group consisting of:
   an epoxy,
   a polyester,
   a silicone,
   polymers derived from bismaleimide, or
   a cyanate ester polymer.

6. A sandwich type insulating material as claimed in claims 4 or 5 wherein the corona resistant polymeric material contains particles of inorganiic corona resistant material in a preselected amount of at least one of the compounds selected from the group consisting of:
  boron nitride,
  aluminum nitride,
  silicon nitride,
  aluminum oxide,
  magnesium oxide,
  beryllium oxide,
  silicon oxide,
  zirconium oxide, and
  titanium oxide,
wheretin the particles of inorganic corona resistant material are present as a finely divided material having a particle size of less than 0.1 micron.

7. The sandwich type insulating material as claimed in claims 4 or 5 wherein the polymeric material contains particles of inorganic corona resistant material between 10–40% by weight of at least one of the compounds selected from the group consisting of:
  boron nitride,
  aluminum nitride,
  silicon nitride,
  aluminum oxide,
  magnesium oxide,
  beryllium oxide,
  silicon oxide,
  zirconium oxide, and
  titanium oxide,
in a particle size of less that 0.1 micron.

8. A sandwich type insulating material as claimed in claims 4 or 5 wherein the corona resistant polymeric material contains particles of inorganic corona resistant material coulprising between 10–40% by weight of at least one of the compounds selected from the group consisting of:
  boron nitride,
  aluminum nitride,
  silicon nitride,
  aluminum oxide,
  magnesium oxide,
  beryllium oxide,
  silicon oxide,
  zirconium oxide, and
  titanium oxide,
in a particle size of less than 0.1 micron
and the preselected polymeric resin contains between 10–40% by weight of at least one of the compounds selected from the group consisting of:
  boron nitride,
  aluminum nitride,
  silicon nitride,
  aluninum oxide,
  magnesium oxide,
  beryllium oxide,
  silicon oxide,
  zirconium oxide, and
  titanium oxide.

9. An insulating tape or wrapper suitable for insulating electrical coils of a dynamoelectric machine comprising:
  a film of a corona resistant polymeric material selected from the group consisting of:
    a polyester,
    a polyesteramide,
    a polyesteramideimide,
    a polyimide,
    a polyamide,
    a polyamideimide,
    a polyetherimide,
    a polycarbonate,
    a polysulfone, and
    a polyether,
  wherein the above polymeric material contains between 10–40% by weight of at least one of the compounds selected from the following group:
    boron nitride,
    aluminum nitride,
    silicon nitride,
    aluminum oxide,
    magnesium oxide,
    beryllium oxide,
    silicon oxide,
    zirconium oxide, and
    titanium oxide,
  in a particle size of less than 0.1 micron,
  a layer of mica paper consisting of laminated to said corona resistant polymeric material be means of a preselected polymeric resin,
  said resin being selected from the group consisting of:
    an epoxy,
    a polyester,
    a silicone,
    polymers derived from bismaleimide, or
    a cyanate ester polymer,
  wherein said resin contains particles of a corona resistant material in the amount of 0–40% by weight in a particle size less than 0.1 micron selected from the group consisting of:
    boron nitride,
    aluminum nitride,
    silicon nitride,
    aluminum oxide,
    magnesium oxide,
    beryllium oxide,
    silicon oxide,
    zirconium oxide, and
    titanium oxide.

10. A tape or wrapper as claimed in claim 9 wherein the mica paper layer is at least partially impregnated with said polymeric resin.

11. A laminated tape to be lapped about a bundle of conductors forming a coil, said tape comprising:
  a film of a polyimide material
    said polyimide material containing between 10–40% by weight of aluminum oxide powder having a particle size of less than 0.1 microns
  a layer of mica paper consisting of mica laminated to said polyimide material to produce a laminated tape.

12. A tape as claimed in claim 11 wherein said polyimide material is laminated to said mica tape using a polymeric resin.

* * * * *